July 10, 1962 A. J. TIERI 3,042,961
OPHTHALMIC MOUNTING HINGES
Filed March 16, 1960
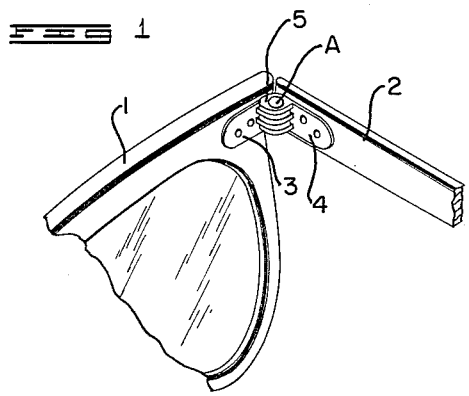
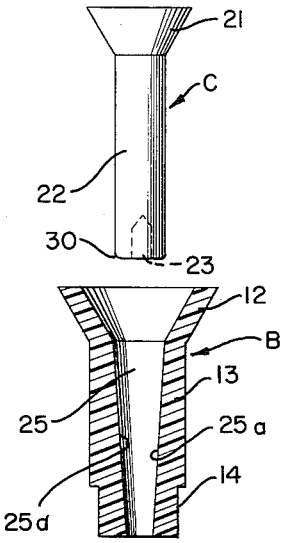
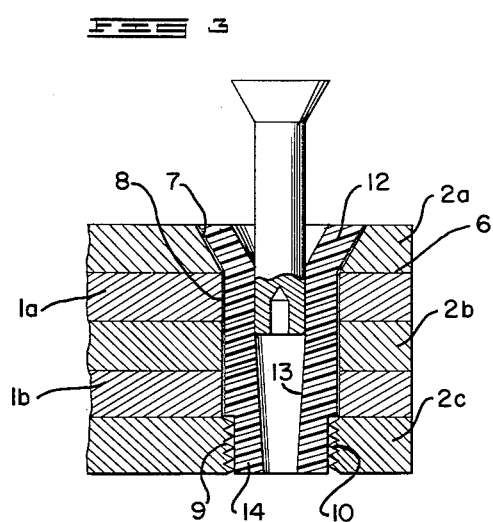
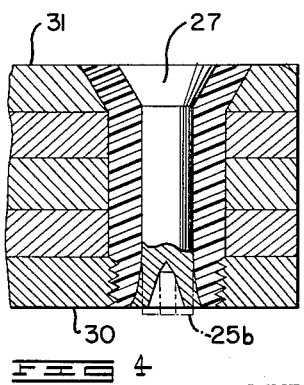
INVENTOR
ARTHUR J. TIERI
BY *Raymond L. Bassett*
ATTORNEY 3,042,961
OPHTHALMIC MOUNTING HINGES
Arthur J. Tieri, 323 Worcester St., Southbridge, Mass.
Filed Mar. 16, 1960, Ser. No. 15,350
1 Claim. (Cl. 16—128)

This invention relates to improvements in the temple connections for eyeglasses and spectacles and has for its primary object an assembly involving details of construction which facilitate the telescopic insertion of the various hinge parts and the anchoring of these parts after assembly.

This invention has for another of its objects an improvement in the hinge structure including the pin or core which is associated with the soft deformable and expansible hinge tube, the parts being constructed to avoid interlocking and distortion during initial assembly.

Another object of the invention is to provide the bore of the hinge structure of a temple connection with inwardly facing projections at one end and a conical seat at the other end and to associate with this bore a deformable sleeve, the latter having an external diameter to be readily insertable in the bore without obstruction from the walls of the latter and having an axial opening for receiving an insert or a pin for exploding the structure into the bore of the temple connection.

A further object of the invention is to provide a hinge of the type in question in which the parts are so constructed and arranged that the upper and lower surfaces, when the hinge is assembled, will be flush with the adjacent structure of the spectacles.

These and other objects of the invention will more clearly hereinafter appear by reference to the accompanying drawings forming a part of the instant specification and wherein like characters of reference designate corresponding parts throughout the several views:

FIG. 1 is a fragmentary perspective view showing a spectacle hinge portion embodying overlapping coacting parts;

FIG. 2 is an elevation partly in section showing the hinge portion in exploded position;

FIG. 3 is a side elevation showing the pin partially inserted in the deformable tubular hinge with the latter in position in the spectacle mounting; and FIG. 4 is a vertical section of the completed hinge assembly showing in dotted line the hinge pin prior to the riveting of the lower end.

In FIG. 1 the ophthalmic frame structure is indicated at 1 and a portion of the temple at 2. The frame member 1 and the temple 2 are connected together by the hinge sections 3 and 4, the hinge sections 3 and 4 including the stacked alternately arranged projections or lugs 5 formed with an aligned opening through which the hinge pin comprehending the instant invention extends and is indicated by reference character A.

The projections or lugs forming the overlapping hinge leaf sections are more clearly shown in FIGS. 3 and 4 in which the lugs of the mounting of the ophthalmic frame 1 are indicated at $1^a$ and $1^b$ while the leaves or lugs of the temple are shown alternately arranged at $2^a$, $2^b$ and $2^c$. These lugs or projections have flat abutting parallel surfaces indicated at 6 and are formed with an axially aligned bore comprising the upper tapered portion 7, the medial cylindrical portion 8 and the lower threaded portion 9. As shown in FIG. 3 the upper outwardly tapered portion 7 of the bore extends through a single lug or projection $2^a$ and the threaded lower portion 9 of the bore extends through the bottom lug or projection $2^c$. It will also be noted that the bottom theaded portion 9 of the bore which is contained within the lower lug $2^c$ has its threads or teeth 10 projecting within the diameter of the center portion of the bore 8.

The deformable cylindrical hinge member or slevee B embodies three portions, i.e. the upper flared end 12, the central cylindrical portion 13 and the lower cylindrical portion 14, the latter being of less diameter than the medial portion of the sleeve and having a diameter slightly less than the inner diameter of the toothed lower lug or projection $2^c$. By constructing the hinge sleeve B in this manner it will be obvious that this sleeve can readily be inserted in position in the bore of the hinge parts with the upper flared part 12 seating on the conical face 7, the medial cylindrical part extending through the intermediate leaves of the hinge and the lower restricted portion fitting neatly within the bore of the threaded or toothed bottom leave $2^c$.

The outer diameter of hte deformable hinge sleeve is normally slightly less than the bore formed in the assembled hinge parts so that the deformable sleeve can be readily inserted without injury, however, this deformable sleeve is caused to snugly engage the bore of the hinge parts by a pin C. The pin C includes an outwardly tapered head 21 and a shank 22 formed with a bottom recess 23 at the lower end of the shank, the recess 23 being axially formed therein to receive a tool portion for exploding or riveting this lower end after the parts are assembled within the hinge structure. In order that the pin C may be properly associated with the deformable hinge structure, the head 21 of the pin has a slightly greater diameter than the diameter across the upper flared face of the sleeve portion 12 and the upper part of the tapered bore 25 of the deformable hinge sleeve B is only slightly greater than the diameter of the lower portion of the pin shank 22. By this means, the pin 22 can be initially inserted into the deformable hinge member, as shown in FIG. 3, without deforming the latter but with sufficient frictional engagement present with the initial insertion of the pin shank 22 into the body of the deformable hinge member C to hold these parts together to facilitate the work of assembling the hinge structure in the bore of the hinge lugs. After the initial insertion of the pin in the bore of the deformable hinge, the balance of the core is gradually restricted by being tapered, as shown at $25^a$, so that when the pin is eventually seated the deformable hinge structure will be forced firmly into engagement with the bore in the lug parts, as shown at 4, to provide a compact solid association of parts.

Due to the fact that the bottom portion of the deformable hinge member B is reduced in diameter, as best shown in FIG. 2, to avoid initial engagement with the teeth at the lower portion of the lug assembly, as shown in FIG. 3, it is desirable that the length of the pin be slightly greater than the length of the bore of the assembled lugs, as shown at $25^b$. When the parts are fully assembled, as shown in FIG. 4, the protruding part of the lower extremity of the pin C is forced laterally to such an extent that the bottom surface 30 of the assembly is entirely flush, this flush surface including the lug, the deformable hinge part B and the pin C. The same is true insofar as the head 21 of the pin or core is concerned in that the shank 22, after deforming of the lower end thereof is of just sufficient length that the top surface of the head 21 will be flush with the top surface 31 of the upper hinge lug. In other words, when the pin is fully driven home and the bottom end riveted or exploded by a proper implement the upper and lower surfaces of the hinge assembly are exactly flush with the upper and lower surfaces of the lug assembly forming the two hinge parts.

As the metal pin is spread at the bottom of $25^b$, FIG. 4, it forces the deformable tube which is not metal towards the side of the hole which is threaded. This action locks the tube with the metal lug 30; at the same time, metal core 25$^b$ locks against non-metal tube 14, keeping the tube under compression stress, thereby preventing the pin from loosening.

When the bottom of pin 25$^b$ is spread out, it spreads only about half way to the threads. It does not go as far as to touch the metal so that metal never rubs on metal. The metal pin hinges on the deformable non-metal tube B and the tube B hinges on the metal sides, so that when the temple is opened and closed there is friction action between the pin C and the tube B or the outside wall of the tube and the inside wall of the hole. Whatever the case, it would make no difference because metal will never rub on metal causing wear and a loose and wobbly temple. Instead, a pliable material is used which is compressed and holding frictional tension even as it wears, which is very little because the nylon tube is comparatively soft and very resistant to wear. The metal pin or the inside metal surface of the hole in the hinge, rubbing against this softer material, will also prevent wearing of the metal parts.

What I claim is:

In a hinge assembly, a plurality of superimposed parts having planar abutting surfaces, each of said parts being formed with an opening and said openings being aligned to form a passageway therethrough, the passageway in the upper of the superimposed parts being defined by an upwardly and outwardly flared wall throughout the thickness of said part, and the passageway in the lower of the superimposed parts being defined by a wall of less diameter than the passageway in the other parts, said wall forming the passageway in the lower of the superimposed parts being formed with a series of inwardly projecting threads, a deformable plastic tubular hinge member arranged in said opening, said tubular hinge member having an upper outwardly flared end portion for snugly engaging and seating in the recess defined by said outwardly tapered wall of the upper part of said passageway, said deformable plastic tubular hinge member including a central portion and a lower reduced end portion, the lower reduced end portion being defined by a shoulder positioned at the area of contact between the lower superimposed part and the next adjacent part and having a diameter less than the diameter of the opening in said lower superimposed part, said deformable plastic tubular hinge member having its bore gradually reduced towards its lower end, and a core for said tubular hinge member formed with a portion of such diameter as to enter and expand said tubular hinge member into engagement with the adjacent walls of the superimposed parts defining the passageway therethrough, said core having its upper end flared outwardly to seat snugly within and abut the adjacent flared end face of the tubular hinge member and the lower end portion of said core having an axial recess formed therein for receiving an expanding tool for exploding the material of the core laterally into engagement with the lower portion of the deformable tubular hinge member to urge the structure of the latter between the projecting teeth of the lower part to thereby lock both the tubular hinge member and the core against axial displacement.

References Cited in the file of this patent

UNITED STATES PATENTS

| | | |
|---|---|---|
| 2,302,590 | Waite | Nov. 17, 1942 |
| 2,774,098 | Tieri | Dec. 18, 1956 |
| 2,828,668 | De Angelis | Apr. 1, 1958 |
| 2,921,819 | Rifkin | Jan. 19, 1960 |